US006666319B2

(12) United States Patent
Balzer-Apke et al.

(10) Patent No.: US 6,666,319 B2
(45) Date of Patent: Dec. 23, 2003

(54) SAFETY DEVICE FOR ESCALATORS AND MOVING WALKWAYS

(75) Inventors: Ludwig Balzer-Apke, Velbert (DE); Andreas Tautz, Waltrop (DE); Christian Maletzki, Waltrop (DE)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 10/379,825

(22) Filed: Mar. 6, 2003

(65) Prior Publication Data

US 2003/0168311 A1 Sep. 11, 2003

Related U.S. Application Data

(63) Continuation of application No. 10/307,486, filed on Dec. 2, 2002, now abandoned, which is a continuation of application No. PCT/EP01/04750, filed on Apr. 27, 2001.

(30) Foreign Application Priority Data

Jun. 2, 2000 (DE) ........................................ 100 27 490

(51) Int. Cl.[7] ................................................ B65G 15/00

(52) U.S. Cl. ........................................ 198/323; 198/322

(58) Field of Search ................................ 198/321, 322, 198/323

(56) References Cited

U.S. PATENT DOCUMENTS

| | | | | | |
|---|---|---|---|---|---|
| 4,863,006 | A | * | 9/1989 | Kotkata et al. ............. | 198/323 |
| 5,316,121 | A | * | 5/1994 | Zaharia et al. .............. | 198/323 |
| 5,361,887 | A | | 11/1994 | Zaharia et al. | |
| 5,526,256 | A | | 6/1996 | Sakata et al. | |
| 5,610,374 | A | | 3/1997 | Boom et al. | |
| 5,785,165 | A | * | 7/1998 | Stahlhut et al. ............. | 198/322 |
| 6,230,871 | B1 | | 5/2001 | Balzer-Apke et al. | |
| 6,267,219 | B1 | * | 7/2001 | Spannhake et al. ......... | 198/323 |

* cited by examiner

*Primary Examiner*—James R. Bidwell
(74) *Attorney, Agent, or Firm*—Venable LLP; Robert Kinberg; Daniel G. Vivarelli

(57) ABSTRACT

A device for monitoring the presence. of steps and pallets of an escalator or moving walkway, such that missing steps or pallets are immediately detected, so that the drive will be stopped before the missing or defective part reaches the visible area of the escalator or moving walkway.

22 Claims, 2 Drawing Sheets

SAFETY DEVICE FOR ESCALATORS AND MOVING WALKWAYS

CROSS-REFERENCE TO RELATED APPLICATION

This application is a continuation of U.S. application Ser. No. 10/307,486, filed on Dec. 2, 2002 now abandoned, whih is a continuation of International Application No. PCT/EP01/04750 filed Apr. 27, 2001, which claims priority of German Application No. DE 100 27 490.0 filed Jun. 2, 2000. The disclosures of the foregoing applications and the U.S. patents mentioned below are incoporated herein by reference in their entirety.

BACKGROUND OF THE INVENTION

The invention relates to a device for monitoring the presence of steps and pallets of an escalator or moving walkway, respectively.

According to prevailing national and international safety regulations, escalators and moving walkways have to be equipped so that they may be automatically stopped as soon as problems arise at critical points.

U.S. Pat. No. 5,526,256 to Sakata et al. teaches a control device for passenger transport installations. A first and second microcomputer are provided. The first microcomputer actively communicates, via actuators, with the safety elements, which are responsible for starting the movement of the passenger transport installation. Data from the actuators are used for starting the passenger transport installation. The second microcomputer monitors the behavior of the safety devices on the basis of incoming signals. In case of a breakdown of one of the microcomputers, the passenger transport installation is not stopped, but the second microcomputer overtakes the function of the first one. This arrangement results in significant risks during the continued operation of the passenger transport installation because the defect has not been eliminated but only transferred.

In the operating state of a passenger transport installation, the step or pallet belt is a main source of problems. If a step or pallet actually breaks or falls out of the return strand, persons standing in the visible area of the escalator may be injured unless the escalator or moving walkway is immediately stopped.

U.S. Pat. No. 5,361,887 to Zaharia et al. teaches a generic device for detecting the irregularity in step frequency. A proximity-sensing initiator, connected to a microprocessor, can detect if some pre-determined features are missing from an escalator step. In case of a missing characteristic feature, the drive of the passenger transport installation is stopped. If the microprocessor would break down, the passenger transport installation will no longer be functional, due to safety reasons. However, such a breakdown would result in the passenger transport installation being out of service for longer than is necessary.

SUMMARY OF THE INVENTION

It is an object of the present invention to improve a device for monitoring the presence of steps or pallets of an escalator or moving walkway such that missing steps or pallets are immediately detected, and the escalator or moving walkway drive can be stopped, before the missing or defective part reaches the visible area of the escalator or moving walkway.

It is a further object to provide a new evaluation capability-based criteria that meets current safety regulations and correspond to the norms, and which is still effective when the microprocessor breaks down.

The above and other objects of the invention are achieved by a device for monitoring a presence of steps of an escalator or pallets of a pallet belt of a moving walkway having at least one initiator, which is operative as a function of proximity for producing signals representing a determination of a missing step of the escalator or a pallet of the pallet belt of the moving walkway. The device also includes an evaluation and control unit having at least two processors that are operatively coupled with the at least one initiator for stopping a drive of the escalator or moving walkway in response to the signals from the at least one initiator indicating a determination of a missing step or pallet by the at least one initiator. The at least two processors operate independently from each other, monitor each other, control the signals of the at least one initiator, and exchange with each other status messages about the respective operating state of the at least one initiator and their own operating state within predeterminable time intervals.

According to another aspect of the invention, there is provided a method for monitoring a presence of steps of an escalator or pallets on a pallet belt of a moving walkway. The steps of the method include: sensing a presence of predeterminable, characteristic and recurring feature at a predeterminable place of the step or pallet belt in a contactless manner with at least one initiator that produces signals representing the feature or absence thereof; supplying the signals to an evaluation and control unit comprising at least two processors; processing and comparing the signals in the at least two processors of the evaluation and control unit; monitoring each processor with one of the other processors; and stopping a drive of the escalator or moving walkway when a feature is detected as absent.

According to an exemplary embodiment of the invention, there is provided a device for monitoring the presence of steps of an escalator or pallets of a pallet belt of a moving walkway having at least one initiator arranged in proximity to a reversing area for each direction of the escalator or moving walkway. The initiator is operative as a function of proximity for producing signals representing a determination of a missing step of the escalator or a pallet of the pallet belt of the moving walkway. The device further includes an evaluation and control unit having at least two processors operatively coupled with the at least one initiator for stopping a drive of the escalator or moving walkway in response to the signals from the at least one initiator indicating a determination of a missing step or pallet by the at least one initiator. According to this embodiment, the at least two processors operate independently from each other and control the signals of the at least one initiator.

Thus, the invention enables the contactless detection of missing steps or pallets on the basis of characteristic and always-recurrent features, i.e., features that are present at each step or pallet.

The axel of each step or pallet can, for example, be used as the characteristic feature. The axel usually cooperates with a roller, which rolls on a guide and is thus always arranged on the same level.

Preferably, the initiator(s) is/are positioned in the region of the housing by means of a respectively associated support and is/are directed towards the characteristic feature, for example the bolt of the step or pallet rolls, which are provided outside the drive branch.

For preventing the missing or defective component (step or pallet) from reaching the visible area of the escalator or moving walkway, the initiator(s) is/are preferably provided in the return strand in proximity to the reversing area of the step or pallet belt, so that upon detecting a missing step or pallet, the drive of the escalator or moving walkway can be immediately stopped via the evaluation and control unit.

Usually, it is sufficient to provide the device with a single initiator for each running direction of the escalator or moving walkway. However, if the effective regulations of individual countries prescribe more, i.e. stricter criteria, two initiators placed side by side are used, so that a redundant safety is given.

According to another aspect of the invention, processors, which operate independently from each other and control the signal(s) of the initiator(s), are provided in the region of the evaluation and control unit, which processors preferably monitor each other. The processors are coupled with safety contacts for immediately stopping the drive of the escalator or moving walkway. The processors exchange status messages with each other about the respective operating state of the initiator(s), on the one hand, and their own operating state, on the other hand, within pre-determinable time intervals.

If an initiator breaks down, or if the the processors, which monitor each other, are not in agreement, the drive of the escalator or moving walkway is automatically stopped.

The velocity profiles (normal speed, creep speed) relating to the escalator or moving walkway are stored within the evaluation and control unit, so that the throughput times, which change due to changing velocities, at the initiator(s) can be recognized without any problems by the evaluation and control unit and associated with the respective operating state. For adaptation to different speeds, so-called self-learning programs, such as adaptive speed recognition, autotuning and teach-in methods, can be used.

For maintenance of the escalator or moving walkway, a manual drive of the step or pallet belt via special control elements is provided (driving mode for inspection), so that the safety device can be switched off for this purpose.

The objects of the invention are achieved by means of exemplary embodiments shown in the drawings and described as follows.

DETAILED DESCRIPTION OF THE INVENTION

Figures 1, 2:
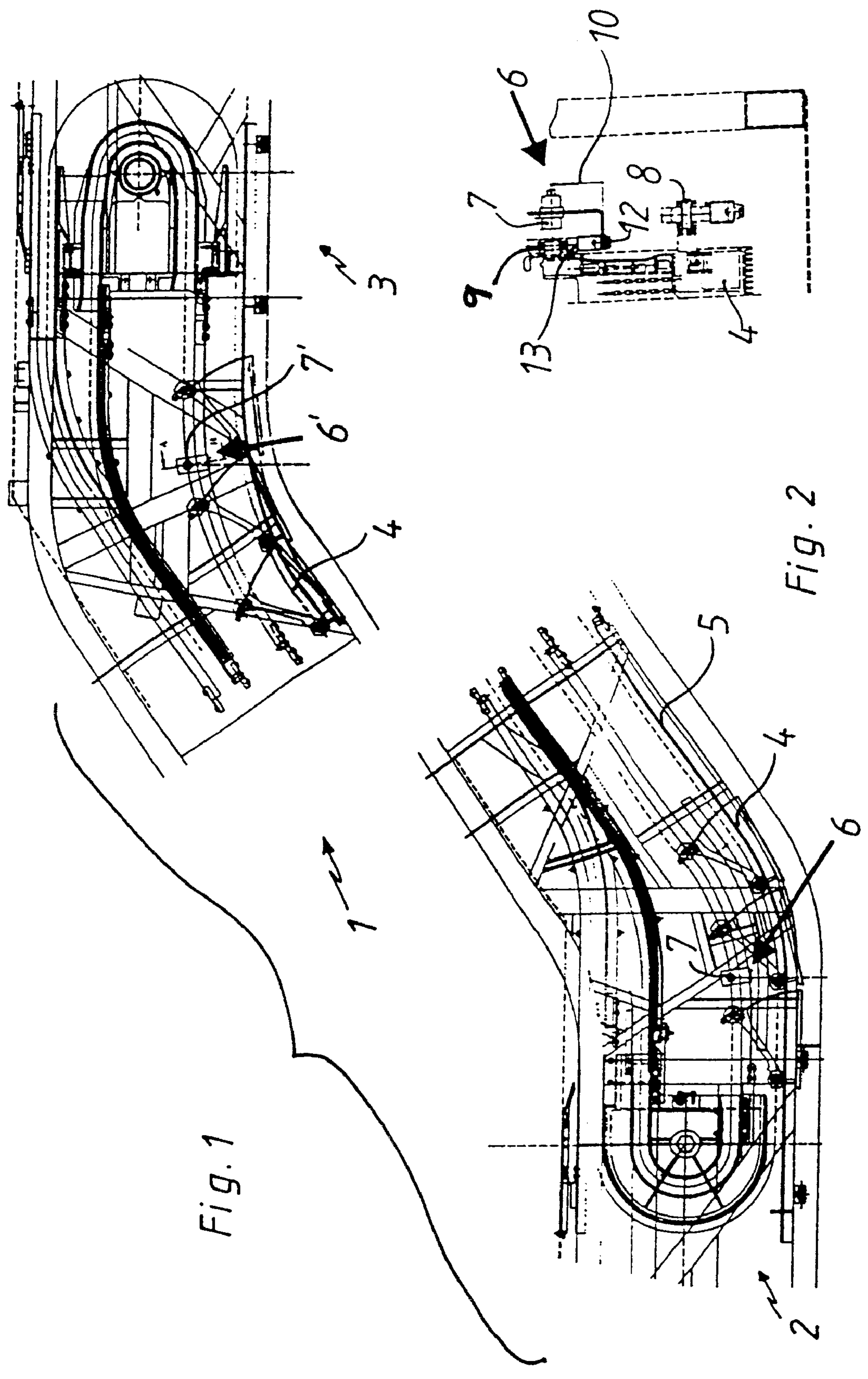
FIG. 1 is a schematic diagram showing a partial side view of an escalator with a safety device according to the invention.
FIG. 2 is a schematic, including a partial block diagram, of the safety device.

FIG. 1 shows an escalator 1 with two reversing areas 2,3 for the steps 4 of the step belt 5. In the return strand, i.e., in the area of escalator 1 not normally visible, supports 6,6' are provided in proximity to the reversing areas 2,3, which supports respectively receive initiator 7,7', which is graphically depicted.

FIG. 2 shows a partial view of support 6, a step 4, a driving element 8 coupled to step 4, as well as a step roll 9. Furthermore, FIG. 2 shows the support 6, which supports the initiator 7 according to the invention in this diagram, which initiator cooperates with an evaluation and control unit 11 (FIG. 3) represented in FIG. 2 via a line 10. The support 6 is fixed in the region of housing 12. Step roll 9, which rolls on a guide path 13, always has the same distance to each step 4, so that it is possible without any problems to direct the initiator 7 towards the bolt (not shown) of step roll 9, so that the same represents a characteristic, always recurring feature of each step 4.

Figure 3:
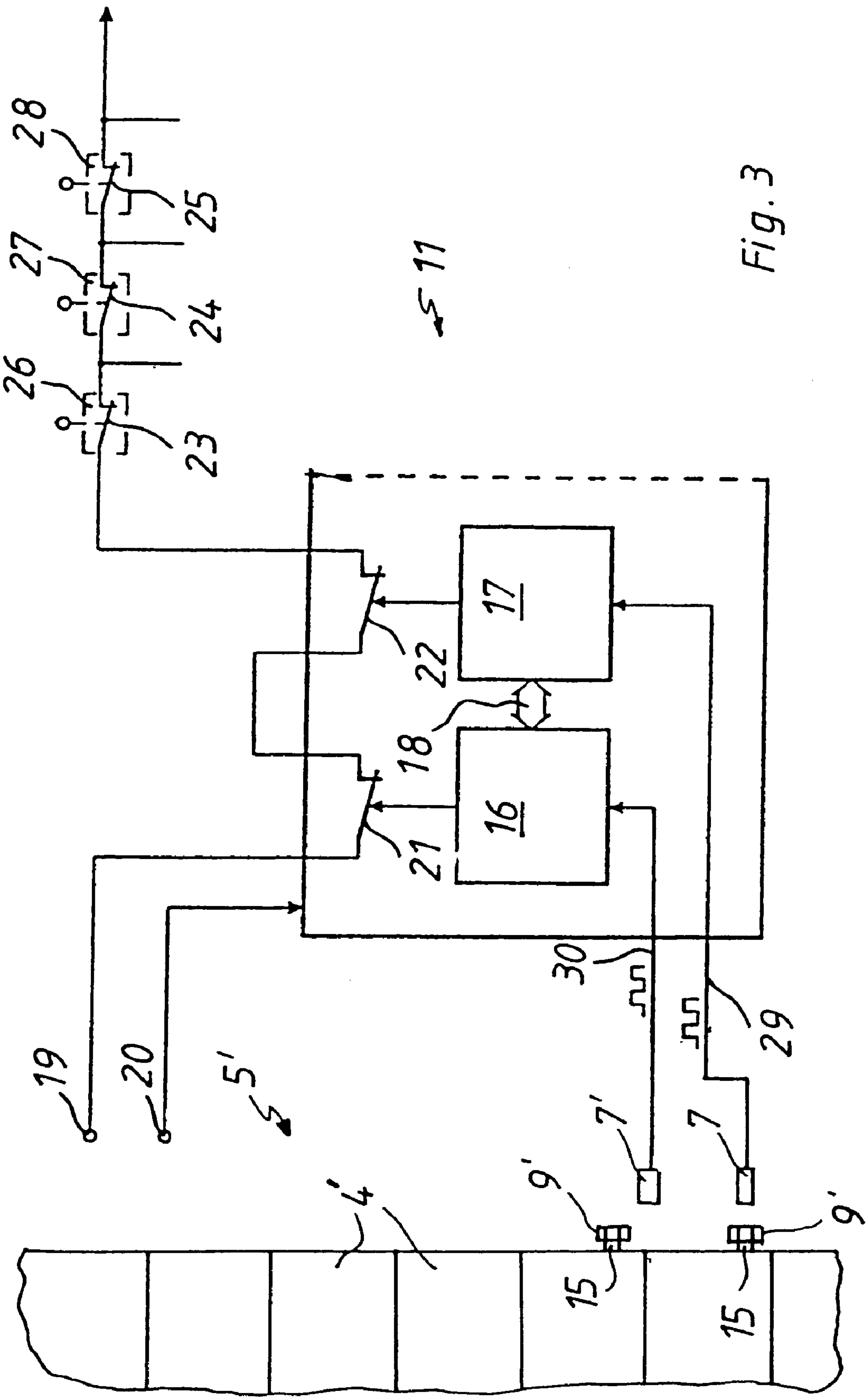
FIG. 3 is a partial representation of the evaluation and control unit in combination with the initiators.

FIG. 3 is a schematic diagram showing the evaluation and control unit 11, which is in active relation with two initiators 7,7', which are positioned with pre-determinable distance to each other. Furthermore, FIG. 3 shows a pallet belt 5' including pallets 4' of a graphically depicted moving walkway. Each pallet 4' is provided with a pallet roller 9', which is connected to the respective pallet 4' via a bolt 15. The initiators 7,7' are again provided in proximity to reversing area (not shown) of the pallets 4' and directed towards the level of the pallet bolt 15, which represents a characteristic and always recurring feature.

The evaluation and control unit 11 includes two microprocessors 16,17, which are connected to the initiators 7,7'. The microprocessors 16,17 are interconnected via data lines 18, so that a mutual monitoring is ensured. Thus, the microprocessors 16,17 not only control themselves with respect to locally occurring disturbances, but also check whether the initiator impulses, which are supplied to the respectively other microprocessor 16,17, are within a set tolerance range. The reference numerals 19,20 indicate the power supply of the so-called safety chain and the power supply of the evaluation and control unit 11 itself, respectively.

In case of a disturbance in the range of one of the initiators 7,7', the contact 21 or 22 of graphically depicted safety relays is actuated by microprocessor 16 or 17, which leads to the immediate stopping of the graphically depicted drive of the moving walkway. Outside the evaluation and control unit 11, other contacts 23,24,25 of other safety elements 26,27,28, e.g. emergency shutdown contacts or the like, are provided.

If one of the initiators 7,7' breaks down or if the start signals exchanged between the microprocessors 16,17 do not coincide, the drive of the moving walkway will automatically be stopped. If one of the initiators 7,7' fails to detect the characteristic feature, namely bolt 9' of a pallet 4', within a predetermined time interval, this failed detection is transmitted to the respective microprocessor 16,17 via the signal lines 29,30, whereby the drive can be stopped.

In the normal case (when the escalator is running), there is a sequence of impulses (signals), wherein the evaluation unit 11 also monitors defects of the initiators 7,7' or the lines 29,30 themselves. The signals are comprised between 0 and 1. If one signal becomes a constant 0 or 1, it can be assumed that there is a defect in the region of an initiator 7,7' or a line 29,30. Consequently, the drive can be stopped.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A device for monitoring a presence of steps of an escalator or pallets of a pallet belt of a moving walkway, comprising:

at least one initiator which is operative as a function of proximity for producing signals representing a determination of a missing step of the escalator or a pallet of the pallet belt of the moving walkway; and an evaluation and control unit comprising at least two processors operatively coupled with the at least one initiator for stopping a drive of the escalator or moving walkway in response to the signals from the at least one initiator indicating a determination of a missing step or pallet by the at least one initiator, wherein the at least two processors operate independently from each other, monitor each other, control the signals of the at least one initiator, and exchange with each other status messages about the respective operating state of the at least one initiator and their own operating state within predeterminable time intervals.

2. The device according to claim 1, wherein the at least one initiator is arranged in a return strand in proximity to a reversing area of one of a step and pallet belt.

3. The device according to claim 1, wherein the at least one initiator is placed in a curved transition area of the escalator.

4. The device according to claim 1, wherein multiple initiators are placed adjacent to each other.

5. The device according to claim 1, wherein at least one initiator is provided in a reversing area of one of a step and pallet belt.

6. The device according to claim 1, wherein at least one initiator is arranged in proximity to a respective reversing area for each running direction of the escalator or moving walkway.

7. The device according to claim 1, wherein the at least one initiator is coupled to a support that is coupled to a housing of the escalator or moving walkway.

8. The device according to claim 1, wherein the at least one initiator is directed towards a bolt of a step or pallet roll provided outside a respective drive branch.

9. The device according to claim 1, and further including safety contacts, wherein the processors are coupled to the safety contacts which are operative to stop a drive of one the escalator and moving walkway in response to an output from one of the processors.

10. A device for monitoring the presence of steps of an escalator or pallets of a pallet belt of a moving walkway, comprising:

at least one initiator arranged in proximity to a reversing area for each direction of the escalator or moving walkway, which is operative as a function of proximity for producing signals representing a determination of a missing step of the escalator or a pallet of the pallet belt of the moving walkway; and an evaluation and control unit comprising at least two processors operatively coupled with the at least one initiator for stopping a drive of the escalator or moving walkway in response to the signals from the at least one initiator indicating a determination of a missing step or pallet by the at least one initiator, wherein the at least two processors operate independently from each other and control the signals of the at least one initiator.

11. The device according to claim 10, wherein the at least one initiator is arranged in a return strand for each direction of the escalator or moving walkway for use in the escalator.

12. The device according to claim 10 for use in the escalator, wherein the at least one initiator is placed in a curved transition area of the escalator.

13. The device according to claim 10, wherein multiple initiators are placed adjacent to each other.

14. The device according to claim 10, wherein at least one initiator is provided in the reversing area of the step or pallet belt.

15. The device according to claim 10, wherein the at least one initiator is coupled to a support that is coupled to a housing of the escalator or moving walkway.

16. The device according to claim 10, wherein the at least one initiator is directed towards a bolt of the step or pallet roll provided outside a respective drive branch.

17. The device according to claim 10, wherein the processors monitor each other.

18. The device according to claim 10, and further including safety switches, wherein the processors are coupled to the safety contacts that which operative to stop a drive of the escalator or moving walkway in response to an output of one of the processors.

19. The device according to claim 10, wherein the processors exchange information about the operating state of the at least one proximity-activated initiator and the processors' own operating state within predetermined time intervals.

20. A method for monitoring the presence of steps of an escalator or pallets on a pallet belt of a moving walkway, comprising:

sensing a presence of a predeterminable, characteristic and recurring feature at a predeterminable place of the step or pallet belt in a contactless manner with at least one initiator that produces signals representing the feature or absence thereof;

supplying the signals to an evaluation and control unit comprising at least two processors;

processing and comparing the signals in the at least two processors of the evaluation and control unit;

monitoring each processor with one of the other processors; and stopping a drive of the escalator or moving walkway when the feature is detected as absent.

21. The method according to claim 20, wherein the sensing step further comprises:

sensing the pre-determinable, characteristic, and recurring feature with at least two initiators which transmit their signals to the evaluation and control device.

22. The method according to claim 20, wherein the monitoring step further comprises the step of:

adapting to varying speeds of one of the escalator or moving walkway based on self-learning programs, including adaptive speed recognition, autotuning, and teach-in programs.

* * * * *